United States Patent Office 2,822,791
Patented Feb. 11, 1958

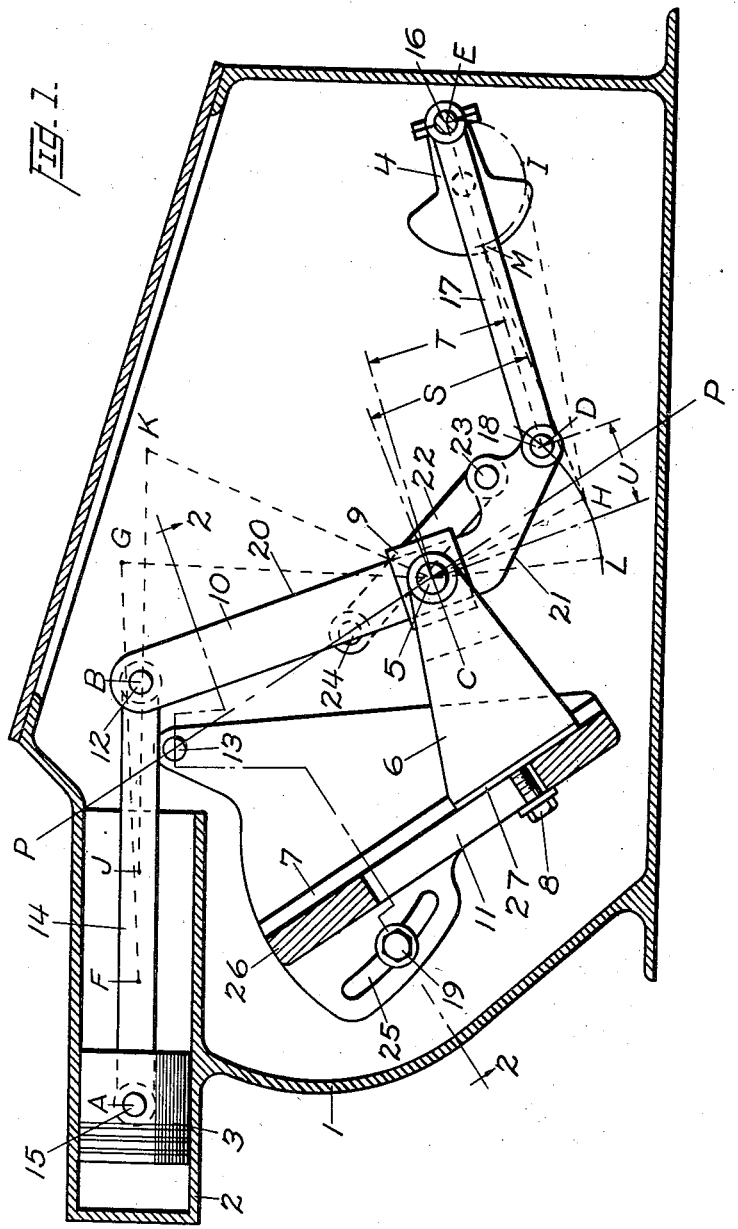

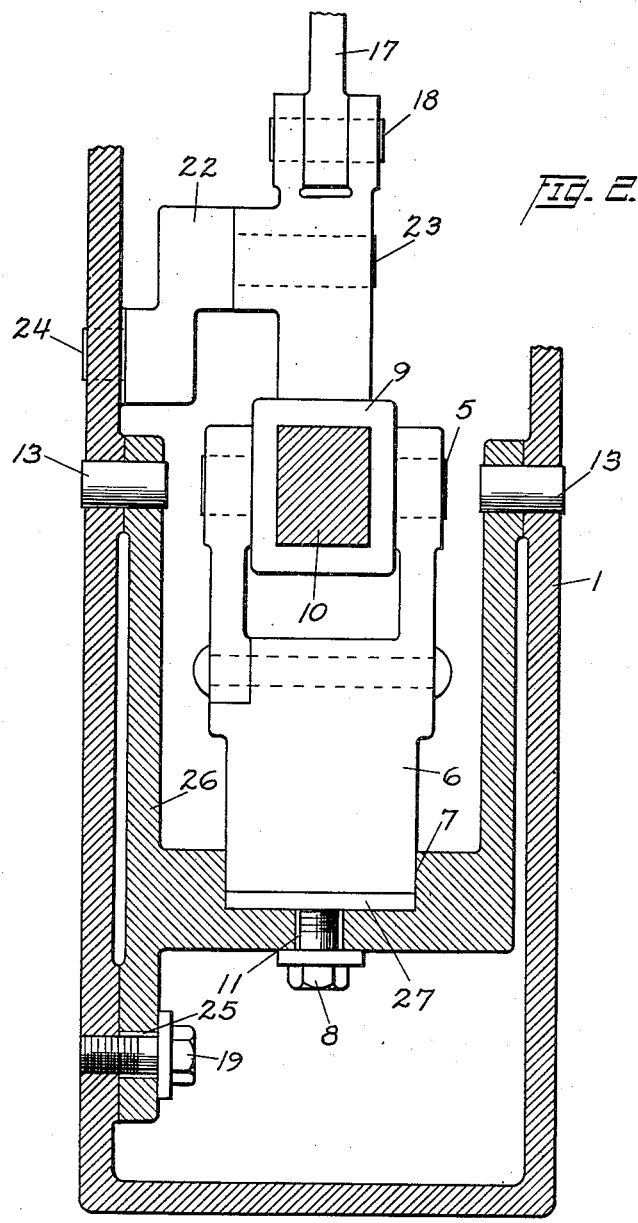

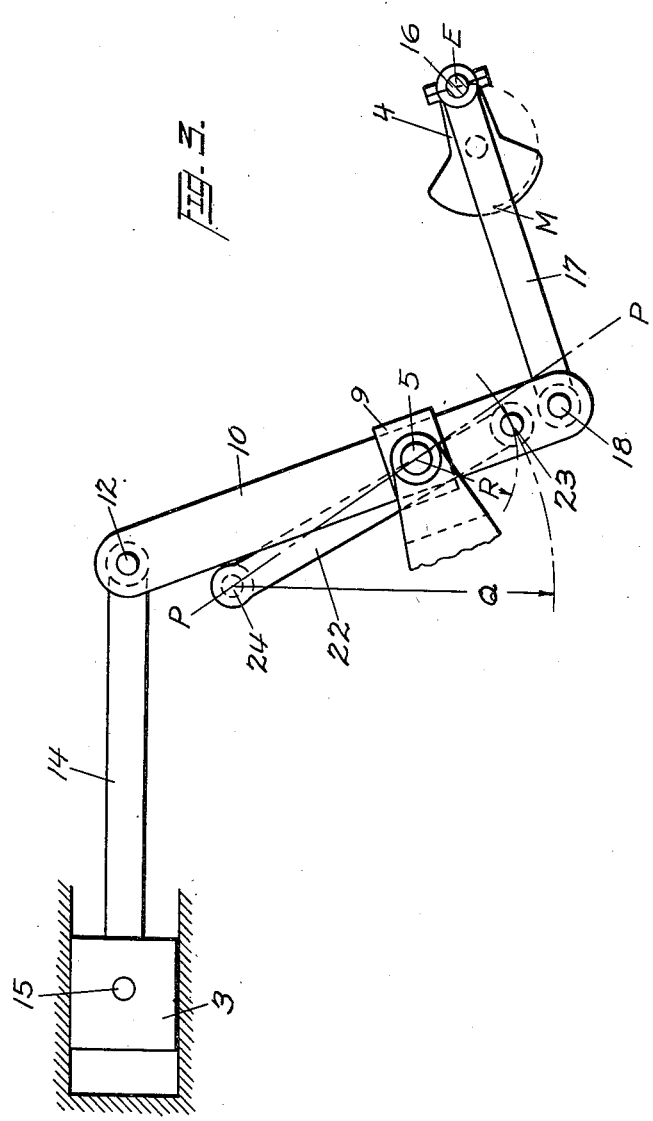

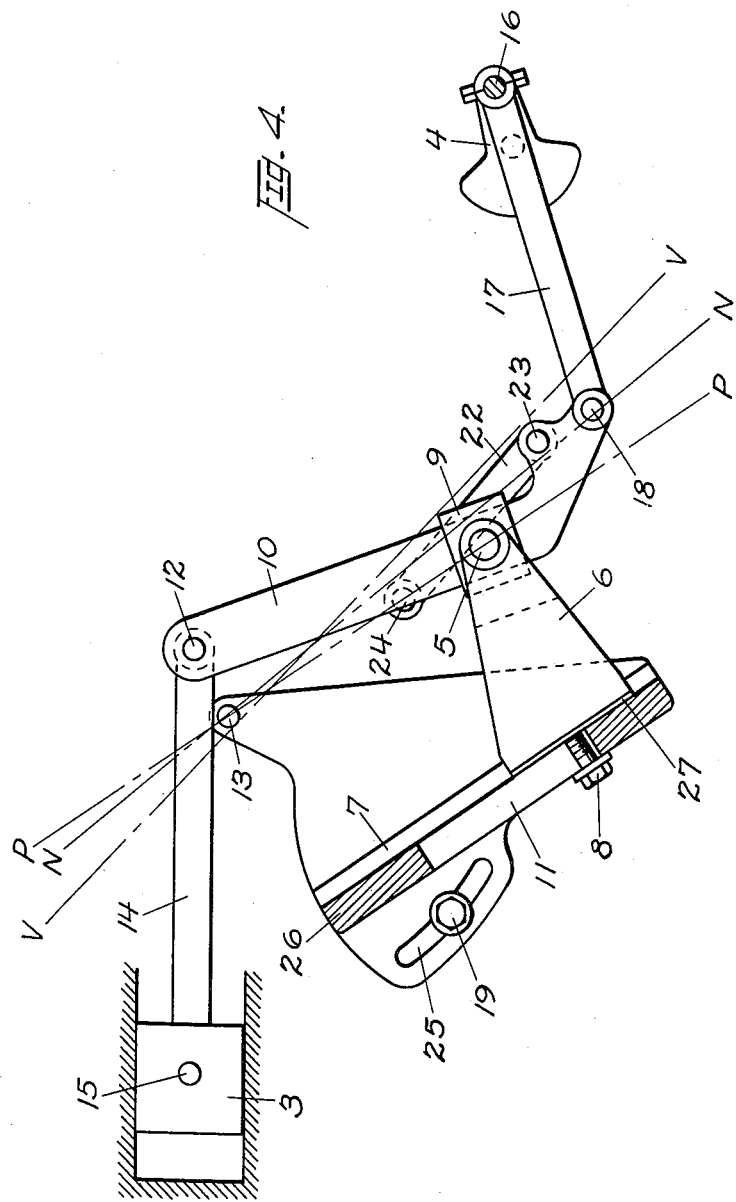

2,822,791

VARIABLE STROKE PISTON ENGINES

Arnold E. Biermann, Fairview Park, Ohio

Application July 1, 1955, Serial No. 519,314

7 Claims. (Cl. 123—48)

This invention relates to variable stroke internal combustion engines. The overall objective of this invention is to provide a practical and efficient engine that is particularly adapted for use in automotive vehicles.

A general object of this invention is to improve part-load engine efficiency through the use of a practical variable stroke mechanism. In the part-load operation of fixed-stroke piston-type internal combustion engines the piston friction and the pumping losses (power required to induct and expel air to and from the engine) consume a large proportion of the total energy of the fuel as the load is decreased. This invention reduces these losses by operating with open throttle and adjustment of the length of the piston stroke to suit the power requirement.

A further object of this invention is to provide a mechanism whereby the engine compression ratio is higher for short and intermediate strokes than it is for long strokes. Because of the greater surface-to-volume ratio and consequently the greater amount of cooling of the cylinder charge at short strokes it is possible to raise the compression ratio without fuel knock. This ability to provide the maximum allowable compression ratio for any length of stroke contributes to maximum efficiency at all stroke lengths.

Another object of this invention is to provide an adjustable and convenient means of changing the compression ratio of a variable stroke engine so that it is possible to use fuels of differing quality without damage caused by fuel knock.

A further object of the invention is to provide a practical variable stroke engine mechanism having substantially harmonic motion of the piston element. In this specification harmonic motion of the piston element is defined as that motion producing equal piston travel for each 90 degrees of crank rotation starting from one end of the piston stroke. The conventional crank mechanism, because of the angularity of the connecting rod, produces a non-harmonic motion of the piston. For example, in a single acting piston and crank arrangement the piston travels considerably farther in the first 90 degrees of crank travel as it moves toward the crank than it does in the latter 90 degrees of travel. This unequal motion causes unbalance in single cylinder and 4 cylinder in-line engines. The external unbalanced forces can be equalized in 6 cylinder in-line engines but cause high internal bearing loads. In any case it is thus desirable to achieve harmonic motion and in this manner solve these problems. An object of this invention is to provide substantially harmonic piston motion over a wide range of piston strokes.

These and other advantages of this invention will be described in the following in which:

Figure 1 is a simplified sectional view through the engine.

Figure 2 is a section view taken along line 2—2 of Fig. 1.

Figure 3 is a schematic diagram of an alternate form of the invention.

Figure 4 is a schematic diagram of the linkage mechanism of Fig. 1 showing the paths of fulcrum movement to obtain specific variations of compression ratio with change of piston stroke.

In the embodiment of the invention shown in Figs. 1, 2 and 4 the frame 1 supports cylinder 2 in which piston 3 reciprocates. Crankshaft 4 is journaled in said frame. The slide platform 26 is pivoted to frame 1 through pivots 13 and is adjustably positioned on said frame by means of cap screw 19 and slot 26. The fulcrum-carrier bracket 6 is adjustably positioned in slide 7 of the slide platform. Capscrew 8 in conjunction with slot 11 provides adjustable positioning means for the bracket 6. Fulcrum pins 5 which support the crosshead 9 are pivotably mounted on bracket 6. Rocker lever 10 is slidably mounted in crosshead 9 so that as the fulcrum carrier bracket 6 is adjusted to different positions along the slide, the lever arm of said rocker lever is varied and consequently the piston stroke is varied.

The carrier bracket 6 is mounted on slide 7 through a spacing plate 27 arranged so that the fulcrum 5 can be moved normal to the mounting base by the use of different spacer thicknesses.

Piston 3 is connected to rocker lever 10 by means of link rod 14, piston pin 15 and pin 12. Crankpin 16 of crankshaft 4 is connected with rocker lever 10 by means of connecting rod 17 and connecting rod pin 18.

Rocker lever 10 embodies a straight portion, 20, upon which the crosshead 9 slides when changing piston stroke. The connecting rod 17 is attached to the offset portion 21 of rocker lever 10. Rocker lever 10 is supported in frame 1 by support link 22 through pin 23. Support link 22 is pivoted to the engine frame with pin 24.

In the operation of the mechanism of Fig. 1 the piston stroke is decreased as fulcrum pin 5 is moved along line P—P toward platform pivot 13. Pivot 13 is located at the zero stroke position of the piston. When the centers of pivots 5, 12 and 13 coincide the stroke is zero and line P—P passes through pivot 13. If pivot 5 is moved along a straight line passing through pivot 13 or through the point of zero stroke the compression ratio of the piston and cylinder will remain constant.

The compression ratio is defined as the sum of the piston swept volume plus the combustion chamber volume above the piston at top center divided by the combustion chamber volume above the piston at top center. (Top center is defined as the piston and crank position where the piston is nearest the cylinder head.) For cylinders with cylindrical combustion chambers having flat ends the compression ratio may be given in terms of stroke length and the clearance between the piston and cylinder head at top center. The compression ratio is then equal to the sum of the stroke length and the piston clearance divided by the piston clearance.

In Fig. 1 the top-center position, mid-center and bottom-center position of the piston pin 15 are denoted by A, F and J respectively. At top-center position the crank and lever train is ABCDE. At mid-stroke position the crank and lever train is FGCHI where I is substantially 90 degrees of crank travel from E. At bottom-center piston position, the crank and lever train is JKCLM. In this description of the invention these are the crank and piston positions which define "substantially harmonic motion."

In this invention approximate harmonic motion of the piston is obtained by increasing the movement of the piston during the crank movement from E to I and by decreasing the movement of the piston during the crank movement from I to M so that the average piston speed during each half stroke is approximately equal. During the piston stroke from A to F in which the piston speed is to be increased the effective length T of the rocker lever arm is shortened by offsetting the rocker lever from the normal axis by the amount U. In this manner the effective length of the arm of the lower part of the rocker lever as shown by T is shorter than it would have been with a straight rocker as shown by S. Thus, as the crank is rotated from E to I the effective lever arm T lengthens and finally equals S. At the same time the effective lever arm of the upper part of the rocker lever shortens. In this manner the piston velocity is decreased in the half of its stroke nearest the crank and the velocity is increased in the half of its stroke farthest away from the crank. By providing a sufficient amount of offset U the piston speed during the two half strokes of the piston can be made approximately equal for each 90 degrees of crank travel. This relationship applies for only one stroke setting.

It will be noted that the effective lever arm of the rocker lever can also be varied in conjunction with a straight rocker lever by locating the crankshaft so that it bears the same angular relationship with the straight rocker that it bears with the offset portion of the offset rocker. The offset rocker is a preferred form, however, because when supported by link 22 as shown in Fig. 1 the combination produces a minimum of cyclic axial sliding between the rocker lever 10 and crosshead 9. A minimum of sliding is produced if the support link pivot 23 is placed approximately on a straight line between pivots 12 and 18.

When harmonic motion is simulated by offsetting one end of the rocker lever, as described in the foregoing, the simulation is only approximate for stroke settings other than that of the design point. In order to more nearly simulate harmonic motion for a wider range of stroke settings this invention embodies another method of cyclically changing the length of the rocker lever arm. Fig. 3 illustrates this method in which the support link 22 is pivoted to the rocker lever 10 by means of pin 23 which is located approximately on the axis of the rocker lever 10. Otherwise the mechanism of Fig. 3 is similar to that of Fig. 1. From Fig. 3 it is apparent that when the radius Q is greater than radius R the difference in position of the respective arcs of these radii is such as to cause the rocker lever 10 to slide downward in crosshead 9 and thus to shorten the rocker lever arm on the piston side and in this manner to progressively reduce piston movement as the crank rotates from position E to M. From Fig. 3 it is further apparent that the arcs produced by the radii Q and R can be further separated or controlled by moving the frame pivot 24 in a direction normal to the fulcrum-movement-line P—P.

In the subject mechanism it will be observed that in order to approximate harmonic motion of the piston, the crankshaft must be located with respect to rocker lever 10 in such a position that when piston 3 is at the top-center position A, Fig. 1, the crankpin 16 is at position E and when piston 3 is at the outward-dead center position J the crankpin is substantially at crank position M. In other words the crankshaft must be located so that each 180 degrees of crank travel produces substantially a full piston stroke. The offset rocker lever method of obtaining harmonic motion, as described in the foregoing violates this principle of equal stroke for each 180 degrees of crank travel. The offset method, however, in combination with the method described in Fig. 3 produces a very satisfactory approximation of harmonic motion throughout the stroke range.

In the operation of internal combustion engines, it is generally desirable, in order to achieve maximum efficiency, to operate with as high a compression ratio as is permissible considering the knock and preignition characteristics of the fuel used. The fuel knock characteristics are generally considered to be a function of the temperature and density of the last portion of the mixture (end gas) to burn. The temperature of the end gas is greatly affected by the ratio of the combustion chamber surface area to the combustion chamber volume (surface/volume ratio). When the surface/volume ratio is high the gases are cooled quite effectively causing low end-gas temperatures and less tendency to knock. With short piston strokes the surface/volume ratio is high; good cooling is effected and as a result the compression ratio can be higher than with the longer strokes. For this reason it is desirable to employ compression ratios of from 7 to 10 for short and intermediate piston strokes and ratios from 4 to 7 for long stroke operation. Because some fuels are more knock-sensitive to temperature than others, the level of the compression ratio used will depend upon individual fuel characteristics. Consequently, there is an appreciable advantage in employing stroke-changing mechanisms that also lend themselves to adjustment of the compression ratio versus stroke relationship.

With some fuels there may be little advantage in changing compression ratio as the stroke is varied. In this invention the compression ratio may be held constant as the stroke is varied by moving the crosshead pivot 5, Figs. 1 and 4, along a line such as P—P which passes through pivot 13 of the slide platform 26. If a somewhat lower compression ratio is desired the crosshead pivot 5 may be moved along a line such as N—N of Fig. 4 by adjusting the angular position of platform 26. If a high compression ratio is desired at short strokes and a low compression ratio at long strokes pivot 5 may be moved along a line such as V—V. Such a path may be obtained through the use of the proper thickness of spacer 27 and by setting platform 26 at the proper angle.

For simplicity, this invention has been described in terms of a simplified single cylinder engine. The invention, however, applies also to multi-cylinder engines and to various arrangements of cylinders.

Having thus described my invention in detail, I do not wish to be limited thereby, except as the appended claims may require, for it is obvious that various modifications and changes may be made in the form of embodiment of my invention without departing from the spirit and scope thereof.

What I claim is:

1. In a variable stroke engine having a frame, a cylinder and piston mounted on said frame, in a combination comprising a crank journaled in said frame, a fulcrum adjustably positioned on said frame, a rocker lever mounted to oscillate on said fulcrum, a connecting link pivoted to said piston and said rocker lever, a connecting rod pivoted to said crank and to said rocker lever, support means pivoted to said rocker lever for guiding said rocker at the point of support on said rocker lever along the arc of a circle to cyclically vary the lever arm of said rocker lever for obtaining harmonic motion of said piston.

2. In a variable stroke piston engine having a frame, a cylinder and piston mounted on said frame, in a combination comprising a crank journaled in said frame, a fulcrum adjustably positioned on said frame, a rocker lever mounted for oscillation on said fulcrum, means operably connecting said piston and said rocker lever, means operably connecting said crank and said rocker lever, a support link pivoted to said rocker lever and to said frame, said fulcrum being adjustably movable along a line extending substantially from the fulcrum position at zero piston stroke to the fulcrum position at maximum piston stroke, said support link being pivoted on said frame substantially on said line of fulcrum movement.

3. In a variable stroke engine having a frame, a cylinder mounted on said frame, and a piston reciprocable in said cylinder, a combination comprising a crank journaled in said frame, a fulcrum adjustably positioned on said frame, a rocker lever mounted to oscillate on said fulcrum, a connecting link pivoted to said piston and said rocker lever, a connecting rod pivoted to said crank and to said rocker lever, support means pivoted to said rocker lever for guiding said rocker lever at the point of support on said rocker lever along the arc of a circle, said fulcrum being adjustably positioned along said rocker lever to vary the stroke of said piston.

4. In a variable stroke engine having a frame and a cylinder and piston mounted on said frame, a combination comprising a crankshaft rotatably mounted on said frame, a crosshead pivoted and adjustably positioned on said frame, a rocker lever mounted to slide and to pivot on said crosshead, said rocker lever having a slide portion which engages said crosshead and an offset portion, a connecting link pivotably connecting said piston and said rocker lever, a crank rod pivotably connecting said crankshaft and said offset portion of said rocker lever, support means pivoted to said frame and to said offset portion of said rocker lever, said support means and said offset portion of said rocker lever combining to provide substantially harmonic motion of said piston.

5. In a variable stroke piston engine having a frame, a cylinder and piston mounted on said frame, a crank journaled on said frame, a slide pivoted on said frame, a fulcrum carrier mounted for adjustable movement on said slide, a fulcrum mounted on said fulcrum carrier, a rocker lever mounted for oscillation on said fulcrum, a connecting link pivoted to said piston and to said rocker lever, a connecting rod pivoted to said crank and to said rocker lever, support means for guiding said rocker at the point of support on said rocker lever along the arc of a circle, said slide and said fulcrum carrier being so proportioned as to guide said fulcrum along a straight line intersecting the pivot axis of said slide, the angular position of said slide being adjustable for varying the compression ratio of said engine.

6. In a variable stroke piston engine, a frame, a cylinder mounted on said frame, a piston reciprocable in said cylinder, a crank journaled in said frame, a slide pivoted on said frame, a fulcrum carrier mounted for adjustable movement on said slide for varying piston stroke, a fulcrum mounted on said fulcrum carrier, a rocker lever mounted for oscillation on said fulcrum, a link pivotably connecting said piston and said rocker lever, a rod pivotably connecting said crank and said rocker lever, support means for guiding said rocker lever at the point of support on said rocker lever along the arc of a circle, said slide and said fulcrum carrier cooperating to guide said fulcrum along a line which is adjustably positioned relative to the pivot axis of said slide so as to variably change the compression ratio of said engine as piston stroke is varied.

7. In a variable stroke piston engine having a frame, a cylinder mounted on said frame, a piston reciprocable in said cylinder, a crank journaled in said frame, a slide pivoted on said frame, a fulcrum carrier mounted for adjustable movement on said slide for varying piston stroke, a fulcrum mounted on said fulcrum carrier, a rocker lever mounted to oscillate on said fulcrum, a link pivotably connecting said piston and said rocker lever, a rod pivotably connecting said crank and said rocker lever, support means for guiding said rocker lever at the point of support on said rocker lever along the arc of a circle, said slide and said fulcrum carrier cooperating to guide said fulcrum along a line intersecting a point located between said cylinder and the pivot axis of said slide so as to increase the compression ratio of said engine as said piston stroke is reduced.

References Cited in the file of this patent

UNITED STATES PATENTS

| 926,564 | Hollopeter | June 29, 1909 |
| 1,189,312 | Tibbels | July 4, 1916 |
| 1,909,372 | McCollum et al. | May 16, 1933 |

FOREIGN PATENTS

| 378,368 | France | Aug. 8, 1907 |